(12) United States Patent
Ohno et al.

(10) Patent No.: US 10,279,430 B2
(45) Date of Patent: May 7, 2019

(54) NOZZLE OF LAYERED OBJECT MANUFACTURING APPARATUS, AND LAYERED OBJECT MANUFACTURING APPARATUS

(71) Applicant: KABUSHIKI KAISHA TOSHIBA, Minato-ku (JP)

(72) Inventors: Hiroshi Ohno, Yokohama (JP); Hideshi Nakano, Yokosuka (JP); Takahiro Terada, Yokohama (JP); Masayuki Tanaka, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 375 days.

(21) Appl. No.: 15/108,997

(22) PCT Filed: Sep. 17, 2014

(86) PCT No.: PCT/JP2014/074601
§ 371 (c)(1),
(2) Date: Jun. 29, 2016

(87) PCT Pub. No.: WO2015/141035
PCT Pub. Date: Sep. 24, 2015

(65) Prior Publication Data
US 2016/0325378 A1 Nov. 10, 2016

(30) Foreign Application Priority Data
Mar. 18, 2014 (JP) .................................. 2014-055664

(51) Int. Cl.
*B23K 26/142* (2014.01)
*B23K 26/14* (2014.01)
(Continued)

(52) U.S. Cl.
CPC ........ *B23K 26/1476* (2013.01); *B22F 3/1055* (2013.01); *B23K 26/083* (2013.01);
(Continued)

(58) Field of Classification Search
CPC .............. B23K 26/1476; B23K 26/147; B23K 26/342; B23K 26/142; B23K 26/144; B23K 26/16
See application file for complete search history.

(56) References Cited

U.S. PATENT DOCUMENTS 4,319,120 A * 3/1982 la Rocca ................ B23K 26/12
219/121.6
2004/0226927 A1 11/2004 Morikazu et al.
(Continued)

FOREIGN PATENT DOCUMENTS

| CN | 101024881 A | 8/2007 |
| CN | 101264519 A | 9/2008 |

(Continued)

OTHER PUBLICATIONS

Machine translation of DE 10064440 B4, Sep. 2018.*
(Continued)

*Primary Examiner* — Geoffrey S Evans
(74) *Attorney, Agent, or Firm* — Oblon, McClelland, Maier & Neustadt, L.L.P.

(57) ABSTRACT

A nozzle of a layered object manufacturing apparatus according to embodiments includes a gas supply part and an exhaust part. The gas supply part includes a gas supply port through which gas is supplied. The exhaust part includes an exhaust port through which the gas is exhausted. The gas supply port and the exhaust port face each other and are spaced apart from each other.

13 Claims, 7 Drawing Sheets

(51) Int. Cl.
   *B22F 3/105* (2006.01)
   *B23K 26/144* (2014.01)
   *B23K 26/342* (2014.01)
   *B23K 26/08* (2014.01)
   *B23K 26/16* (2006.01)
   *B33Y 30/00* (2015.01)
   *B33Y 40/00* (2015.01)
   *B29C 64/153* (2017.01)
   *B29C 64/35* (2017.01)

(52) U.S. Cl.
   CPC ........ *B23K 26/0869* (2013.01); *B23K 26/142* (2015.10); *B23K 26/144* (2015.10); *B23K 26/147* (2013.01); *B23K 26/16* (2013.01); *B23K 26/342* (2015.10); *B22F 2003/1056* (2013.01); *B22F 2003/1059* (2013.01); *B29C 64/153* (2017.08); *B29C 64/35* (2017.08); *B33Y 30/00* (2014.12); *B33Y 40/00* (2014.12); *Y02P 10/295* (2015.11)

(56) References Cited

U.S. PATENT DOCUMENTS

| | | |
|---|---|---|
| 2006/0133947 A1 | 6/2006 | DeBiccari et al. |
| 2007/0193981 A1 | 8/2007 | Peng et al. |
| 2011/0089151 A1* | 4/2011 | Miyagi ................ B23K 26/147 219/121.66 |
| 2011/0168090 A1* | 7/2011 | Clark .................... B23K 26/34 118/620 |
| 2012/0251378 A1* | 10/2012 | Abe .................... B29C 67/0077 419/55 |
| 2014/0015172 A1 | 1/2014 | Sidhu et al. |
| 2015/0108695 A1* | 4/2015 | Okada ................ B29C 67/0077 264/497 |
| 2016/0184927 A1* | 6/2016 | Heinrici et al. ...... B08B 15/007 219/121.84 |

FOREIGN PATENT DOCUMENTS

| | | |
|---|---|---|
| CN | 201511130 U | 6/2010 |
| DE | 10 2005 025 119 A1 | 12/2005 |
| DE | 10064440 B4 * | 7/2009 |
| JP | 2005074466 A * | 3/2005 |
| JP | 2005-105414 A | 4/2005 |
| JP | 2005-105414 A5 | 4/2005 |
| JP | 2006-176880 A | 7/2006 |
| JP | 2009-1900 A | 1/2009 |
| WO | WO 2012/131327 A1 | 10/2012 |

OTHER PUBLICATIONS

International Search Report dated Dec. 16, 2014 in PCT/JP2014/074601 Filed Sep. 17, 2014.

International Search Report Issued Dec. 16, 2014 in PCT/JP2014/074601 Filed Sep. 17, 2014.

* cited by examiner

NOZZLE OF LAYERED OBJECT MANUFACTURING APPARATUS, AND LAYERED OBJECT MANUFACTURING APPARATUS

CROSS-REFERENCE TO RELATED APPLICATIONS

This application is national stage application of International Application No. PCT/JP2014/074601, filed Sep. 17, 2014, which designates the United States, incorporated herein by reference, and which is based upon and clam,s the benefit of priority from Japanese Patent Application No. 2014-055664, filed Mar. 18, 2014, the entire contents of which are incorporated herein by reference.

FIELD

Embodiments relate to a nozzle of a layered object manufacturing apparatus, and a layered object manufacturing apparatus.

BACKGROUND

Conventionally, there has been known a layered object manufacturing apparatuses that form a layered object. The layered object manufacturing apparatus supplies powder of material and emits a laser beam from a nozzle to melt the powder and form material layers, and forms a layered object by stacking the layers.

CITATION LIST

Patent Literature

Patent Literature 1: Japanese Patent Application Laid-open No. 2009-1900

DETAILED DESCRIPTION

Figure 1:
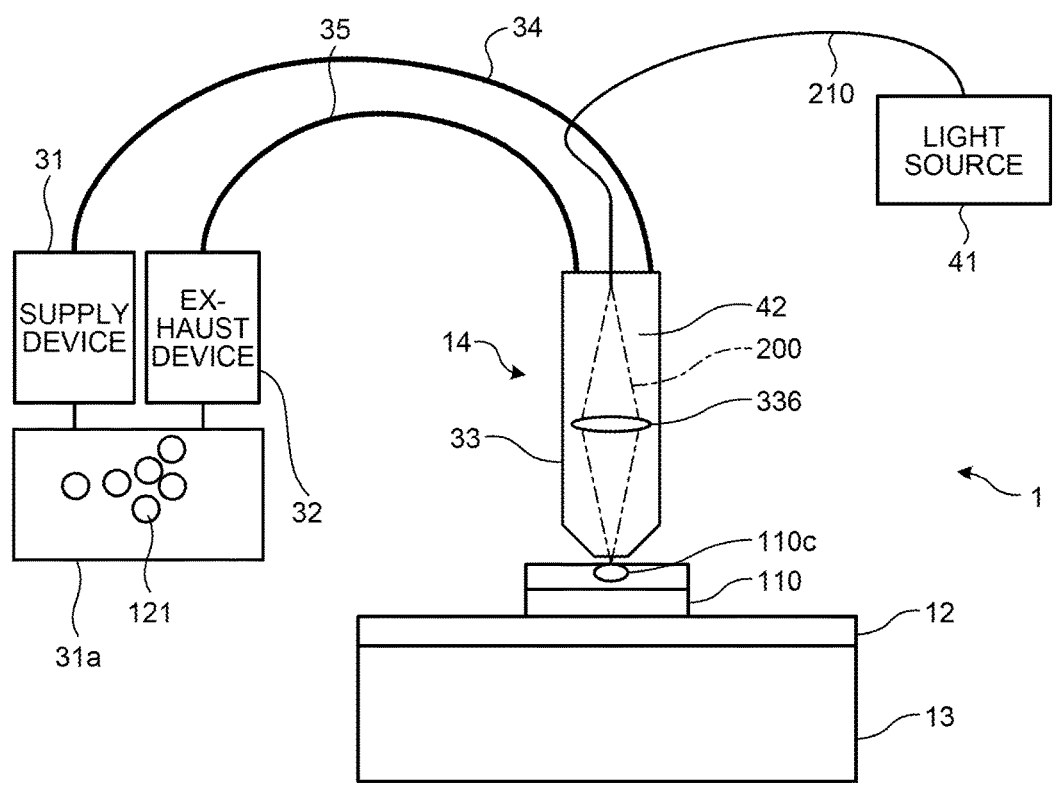
FIG. 1 is a diagram illustrating an example of a schematic configuration of a layered object manufacturing apparatus according to a first embodiment.

According to an embodiment, a nozzle of a layered object manufacturing apparatus, the nozzle comprises: an emitting part from which an energy ray is emitted; a material supply part including a material supply port through which powder of a material is supplied; and an exhaust part including an exhaust port through which gas is exhausted. The material supply port and the exhaust port face each other and are spaced apart from each other, and an optical path of the energy ray is positioned between the material supply port and the exhaust port. The emitting part emits the energy ray toward a flow including the material from the material supply port to the exhaust port.

Hereinafter, exemplary embodiments and a modification of the present invention are disclosed. A configuration or control (technical characteristics) of the embodiments and the modification described below, and a function and a result (advantageous effects) caused by the configuration and the control are merely an example. In the embodiments and the modification of the present invention, a laser beam is utilized as an energy ray. Any beam may be used as the energy ray so long as it can melt a material like a laser beam. An electron beam, a microwave, or an electromagnetic wave in an ultraviolet region may also be used as the energy ray.

The embodiments and the modification disclosed below include the same components. Hereinafter, the same component is denoted by the same reference numeral, and redundant description will not be repeated.

First Embodiment

As illustrated in FIG. 1, a layered object manufacturing apparatus 1 includes a stage 12, a moving device 13, a nozzle device 14, a light source 41, and the like.

The layered object manufacturing apparatus 1 supplies a material 121 with the nozzle device 14 to an object manufacturing spot 110c of an object 110 arranged on the stage 12, and condenses and emits a laser beam 200 onto the object manufacturing spot 110c concurrently. Due to this, the material 121 and the object 110 are welded together. By repeating such an operation, the material 121 is stacked on the object 110, and a layered object (manufactured object) having a predetermined shape can be manufactured. Examples of the material 121 include a metal material and a resin material in a powdered form. One or more materials 121 are used for object manufacturing. The materials 121 are housed in a tank 31a. The laser beam 200 is an example of an energy ray. An energy ray other than the laser beam may be used.

The nozzle device 14 is configured such that a supply pipe 34 and an exhaust pipe 35 are provided to a nozzle 33. The supply pipe 34 is connected to a supply device 31, and the material 121 is supplied from the tank 31a through the supply device 31 and the supply pipe 34. The exhaust pipe 35 is connected to an exhaust device 32, and the material 121 is exhausted into the tank 31a through the exhaust pipe 35 and the exhaust device 32.

The light source 41 is connected to an optical system 42 via a cable 210. The light source 41 includes a transducer element (not illustrated), and emits the laser beam 200 when the transducer element oscillates. The light source 41 can change power density of the laser beam to be emitted.

The laser beam 200 is emitted to a condensing lens 336 included in the nozzle 33 via the cable 210, and is condensed on the object manufacturing spot 110c through the condensing lens 336. Due to this, the object manufacturing spot 110c is melted.

Next, the following describes an object manufacturing method with the layered object manufacturing apparatus 1. The laser beam 200 is condensed on the object manufacturing spot 110c, and the object 110 is melted. At the same time, the material 121 is supplied from the nozzle 33 to be stacked on the object manufacturing spot 110c. In this case, the temperature of the material 121 supplied to the object manufacturing spot 110c is raised by the laser beam 200. Due to this, a temperature difference between the material 121 and the object 110 is reduced in the object manufacturing spot 110c, and the material 121 is more densely stacked on the object 110. That is, density of the manufactured object can be increased.

Figure 2:
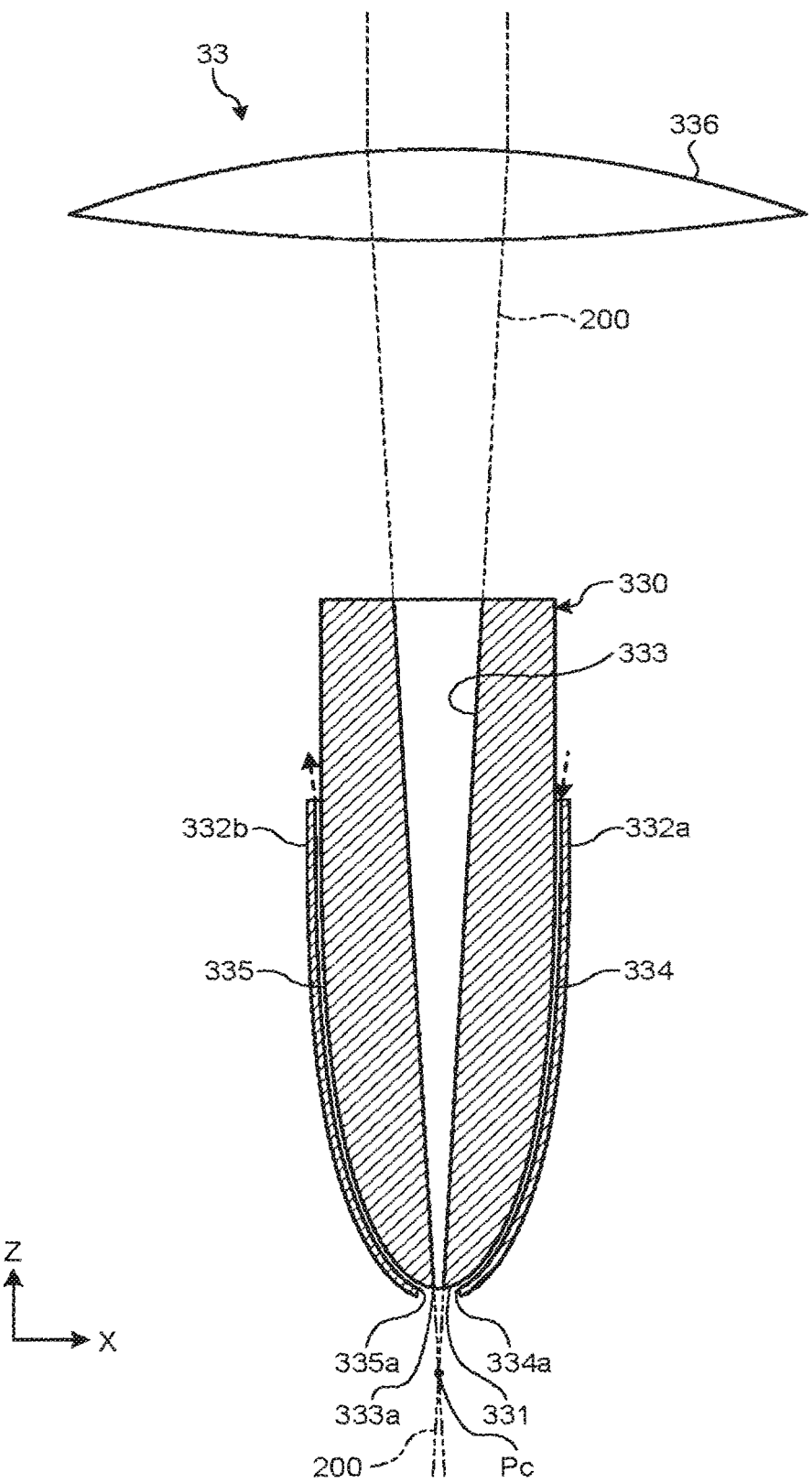
FIG. 2 is a schematic sectional view illustrating a schematic configuration of a nozzle of the layered object manufacturing apparatus according to the first embodiment.
Figure 3:
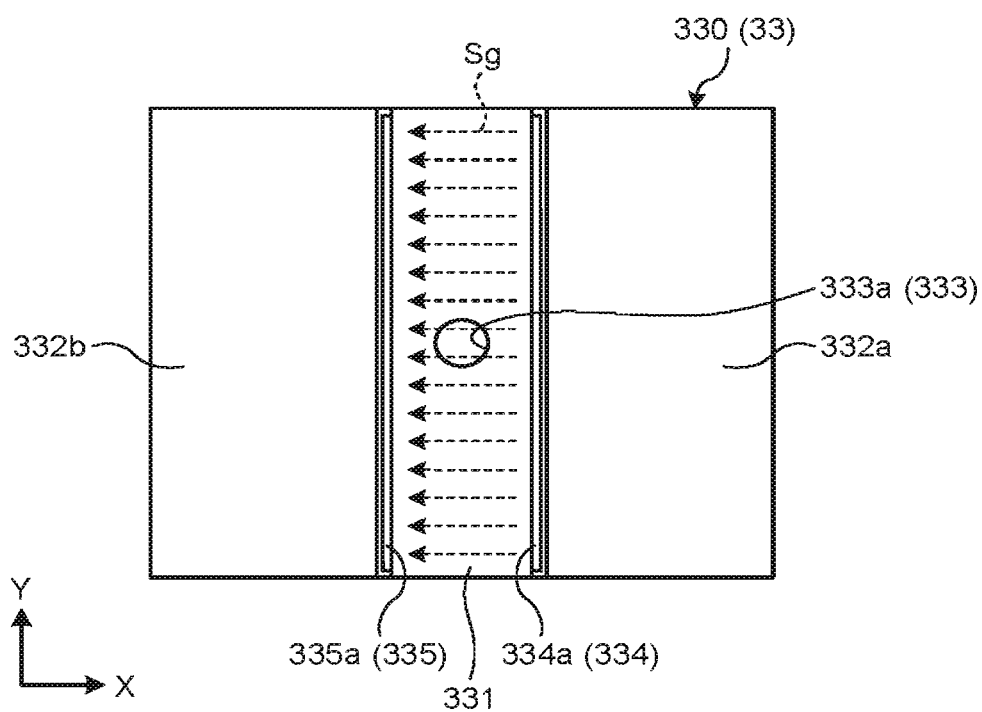
FIG. 3 is a plan view (bottom view) of a tip of the nozzle of the layered object manufacturing apparatus according to the first embodiment.

With reference to FIGS. 2 and 3, the following describes a specific configuration and function of the exemplary nozzle 33 according to the embodiment. For convenience of explanation, an X-direction, a Y-direction, and a Z-direction perpendicular to each other are defined below. The X-direction is a right direction in FIG. 2, the Y-direction is a direction perpendicular to a sheet surface of FIG. 2, and the Z-direction is an upward direction in FIG. 2. An upper surface of the stage 12 is spread along a two-dimensional plane across the X-direction and the Y-direction. In the layered object manufacturing apparatus 1, when at least one of the nozzle 33 and the stage 12 moves in the X-direction and the Y-direction, the nozzle 33 and the stage 12 move relatively to each other, and the material can be stacked along the plane in the X-direction and the Y-direction. The materials 121 are sequentially stacked in the Z-direction, so that a stereoscopic layered object is formed. The X-direction and the Y-direction may be called a horizontal direction, a lateral direction, and the like. The Z-direction may be called a vertical direction, an perpendicular direction, a height direction, a thickness direction, a longitudinal direction, and the like.

The nozzle 33 includes a body 330. The body 330 has a curved surface shape, and made of, for example, a material having high heat resistance such as boron nitride (ceramic material). A longitudinal direction (axial direction) of the body 330 is along the Z-direction, for example. A lateral direction (width direction) of the body 330 is along the X-direction, for example. A depth direction of the body 330 is along the Y-direction, for example. However, the longitudinal direction is not necessarily the Z-direction, and may be the X-direction or the Y-direction. The same applies to the lateral direction. The body 330 has a lower surface 331, side surfaces 332a and 332b, and the like as outer faces (surfaces). The lower surface 331 is positioned at an end (lower end) in the longitudinal direction of the body 330, and is also called an end face. The lower surface 331 faces the object manufacturing spot 110c. The lower surface 331 is formed in a curved surface shape projecting toward the object manufacturing spot 110c (projecting downward). The side surfaces 332a and 332b are positioned at ends in the lateral direction of the body 330, and are also called peripheral surfaces. The side surfaces 332a and 332b are formed in a curved surface shape projecting outward in the width direction (projecting toward the left or right). For example, a section along the width direction and the depth direction of the body 330, that is, a section perpendicular to the longitudinal direction has a quadrangular shape (for example, a rectangular shape). A section along the longitudinal direction and the width direction of the body 330 has a tapered shape that tapers down toward a tip, and has a shape along the width direction. Examples of such a shape of the tip include an arc shape.

A plurality of openings 333, 334, and 335 are provided to the body 330. The opening 333 is a through hole that extends along the axial direction (Z-direction) of the body 330 at the center part in the width direction of the body 330, and is opened at the center part of the lower surface 331. The opening 333 has a substantially circular section. The laser beam 200 is introduced into the opening 333 via the cable 210 and the like. The opening 333 is a path for the laser beam 200 (light flux). That is, the laser beam 200 converged through a lens 336 arranged in the nozzle 33 or arranged outside the nozzle 33 passes through the opening 333. In FIG. 2, the opening 333 is opened along the light flux of the laser beam 200. However, the opening 333 is not necessarily opened along the light flux of the laser beam 200. That is, an opening may have any shape so long as the laser beam 200 passes therethrough. If the opening 333 is opened along the light flux of the laser beam 200 as described above, an amount of fumes that enter through an open end 333a can be reduced. The laser beam 200 that has passed through the opening 333 is emitted from the open end 333a toward the object manufacturing spot 110c, and condensed on a condensing position Pc. The condensing position Pc is set at a position spaced apart from the lower surface 331 by a predetermined distance. The body 330 is an example of an emitting part (emitting component, emitting portion). Although the condensing position Pc is illustrated at a place spaced apart from the lower surface 331 in FIG. 2, the condensing position Pc is actually near the lower surface 331.

The opening 334 is a through hole that extends along the axial direction of the body 330 at an end in the width direction of the body 330 (on the right side in the example of FIG. 2), and is opened at the lower surface 331. The opening 334 extends substantially along the side surface 332a and the lower surface 331. That is, the opening 334 extends substantially along the Z-direction on an upper side, is gradually bent downward toward the laser beam 200 (a negative side of the X-direction in FIG. 2), and is opened at the lower surface 331. The opening 334 is opened along the lower surface 331. An opening direction (opened direction) of the opening 334 at the open end 334a is substantially along the X-direction. At least part of the open end 334a is positioned closer to the tip of the body 330 than the open end 333a. The tip is on an emitting direction side of the laser beam 200 or a side closer to the object manufacturing spot 110c. FIG. 3 illustrates an XY-surface of the tip of the body 330 viewed from a negative direction of the Z-axis. As illustrated in FIG. 3, the open end 334a is arranged at a position spaced apart from the center of the lower surface 331 by a large distance as compared with the open end 333a. At least in a region near the open end 334a, the opening 334 has a rectangular section elongated in the Y-direction. That is, the opening 334 is a through hole in a slit shape. The opening 334 is formed in a slit shape that extends along the laser beam 200 and gradually gets closer to the laser beam 200. In a region closer to the laser beam 200, a direction in which the open end 334a is opposed to the open end 335a is preferably perpendicular to the emitting direction of the laser beam 200. In this case, powder supplied through the open end 334a is conveyed along a surface of the object manufacturing spot 110c, which can reduce components generated when the powder collides with the object manufacturing spot 110c to be scattered. The opening 334 is connected to the supply device 31 via the supply pipe 34 and the like. The opening 334 is used as a path for supplying gas, the material 121, and the like. The opening 334 is an example of a gas supply port and a material supply port, and the body 330 is an example of a gas supply part (gas supply component, gas supply portion) and a material supply part (material supply component, material supply portion).

The opening 335 is a through hole that extends along the axial direction of the body 330 at the other end in the width direction of the body 330 (on the left side in the example of FIG. 2), and is opened at the lower surface 331. The opening 335 extends substantially along the side surface 332b and the lower surface 331. That is, the opening 335 extends substantially along the Z-direction on an upper side, is gradually bent downward toward a positive side of the X-direction (the right side in FIG. 2, the laser beam 200 side), and is opened at the lower surface 331. The opening 335 is opened along the lower surface 331. An opening direction (opened direction) of the opening 335 at the open end 335a is substantially along the X-direction. At least part of the open end 335a is positioned closer to the tip of the body 330 than the open end 333a. The tip is on the emitting direction side of the laser beam 200 or the side closer to the object manufacturing spot 110c. As illustrated in FIG. 3, the open end 335a is arranged at a position spaced apart from the center of the lower surface 331 by a large distance as compared with the open end 333a. At least in a region near the open end 334a, the opening 335 has a rectangular section elongated in the Y-direction. That is, the opening 335 is a through hole in a slit shape. The opening 335 is formed in a slit shape that extends along the emitting direction of the laser beam 200 and gradually gets closer to the laser beam 200. In a region closer to the laser beam 200, the direction in which the open end 334a is opposed to the open end 335a is preferably perpendicular to the emitting direction of the laser beam 200. In this case, the powder supplied through the open end 334a is conveyed along the surface of the object manufacturing spot 110c, which can reduce components generated when the powder collides with the object manufacturing spot 110c to be scattered. The opening 335 is connected to the exhaust device 32 via the exhaust pipe 35 and the like. The opening 335 is used as a path for exhausting (collecting) gas, the material 121, fumes, dust, and the like from a processing region. The opening 335 is an example of an exhaust port and a collection port, and the body 330 is an example of an exhaust part (exhaust component, exhaust portion) and a collection part (collection component, collection portion).

As illustrated in FIG. 3, the open ends 334a and 335a of the openings 334 and 335 are spaced apart from each other in the X-direction (width direction). The open end 333a is positioned at substantially the center between the open end 334a and the open end 335a. The open ends 334a and 335a are opposed to each other and spaced apart from each other. The open ends 334a and 335a face each other in the X-direction. For example, the open ends 334a and 335a directly face each other. The opening directions of the openings 334 and 335 are substantially the same. As seen from FIG. 2, an optical path of the laser beam 200 is positioned between the opening 334 and the opening 335. In this configuration, a gas flow Sg (gas flow, refer to FIG. 3) is formed, the gas flow Sg from the opening 334 to the opening 335 passing through a space through which the optical path of the emitted laser beam 200 passes. A direction of the flow Sg is substantially along the surface of the object manufacturing spot 110c, and substantially along the X-direction. The direction of the flow Sg is substantially along a direction intersecting with the emitting direction of the laser beam 200 (a direction perpendicular to the sheet surface of FIG. 3) or a skewed direction with respect to the emitting direction.

In this way, according to the present embodiment, the opening 335 (exhaust port) is provided for exhausting gas from the optical path of the emitted laser beam 200 (condensing position Pc) and a peripheral part thereof (vicinity, surroundings, an adjacent space). The opening 335 faces the optical path of the laser beam 200 or the peripheral part thereof. Accordingly, for example, the powder of the materials 121 that is not used for object manufacturing or fumes and the like generated in object manufacturing are exhausted through the opening 335, so that the powder of the materials 121 and the fumes can be prevented from remaining or being diffused around the processing region (object manufacturing region). The peripheral part is, for example, a space in which a substantial effect can be obtained for exhausting the powder of the materials 121 or the fumes, supplying the materials 121, and the like with gas supply (or exhaust) according to the embodiment.

In the present embodiment, the opening 334 (gas supply port) is provided for supplying gas to the optical path of the laser beam 200 and the peripheral part thereof. The opening 334 faces the optical path of the laser beam 200 or the peripheral part thereof. If the opening 334 is not provided and only the opening 335 (exhaust port) is provided, a flow of gas gathering from the surroundings is formed toward the opening 335. In this case, the path or a state of the gas flow can hardly be controlled, so that an inconvenient event may be caused such that a proper amount of materials 121 can hardly be introduced to the object manufacturing spot 110c. In the present embodiment, the opening 334 (gas supply port) is arranged corresponding to the opening 335 (exhaust port), so that the flow Sg from the opening 334 toward the opening 335 is formed. As compared with the flow gathering from the surroundings to the opening 335 without the opening 334, the path or the state of the flow Sg from the opening 334 toward the opening 335 is easily adjusted. Thus, an inconvenient event can be easily prevented. By setting an exhausting gas flow rate from the opening 335 to be larger than a supply gas flow rate from the opening 334, gas and the like can be exhausted through the opening 335 from the surroundings thereof in accordance with a difference in the flow rates.

In the present embodiment, the opening 334 and the opening 335 face each other and are spaced apart from each other. Accordingly, the gas flow Sg from the opening 334 to the opening 335 is easily adjusted as compared with a case in which the opening 334 and the opening 335 do not face each other. Thus, for example, exhaust of the powder of the materials 121 and the fumes, and supply of the powder of the materials 121 are easily stabilized. For example, "facing each other (opposing each other)" means a state in which one of the open end 334a (opening 334) and the open end 335a (opening 335) can be seen through the other one thereof. The flow rate from the surroundings into the opening 335 can be adjusted by adjusting a space between the open end 334a and the open end 335a (a length, an angle, posture, a shift amount, and the like). When an opening dimension of the opening 335 is caused to be larger than that of the opening 334, there is an advantage that the materials 121 can be securely collected and the fumes can be securely removed.

In the present embodiment, the nozzle 33 is configured such that the optical path of the emitted laser beam 200 is positioned between the opening 334 and the opening 335. Accordingly, for example, the powder of the materials 121 and the fumes can be exhausted more efficiently, and the powder of the materials 121 can be supplied more efficiently. In a case in which the powder of the materials 121 is supplied from the opening 334 as in the present embodiment, the flow Sg is easily stabilized because the opening 334 and the opening 335 are opposed to each other, so that the powder of the materials 121 may be supplied more stably. Thus, for example, unevenness in object manufacturing tends to be reduced, or accuracy in object manufacturing tends to be improved.

In the present embodiment, the opening 334 and the opening 335 face each other in a direction intersecting with the emitting direction of the laser beam 200 (a center axis direction of the light flux). Accordingly, the flow Sg is generated in the intersecting direction. The direction intersecting with the emitting direction of the laser beam 200 is, for example, a direction perpendicular to the emitting direction, a direction along the surface of the object manufacturing spot 110c, an surface direction of the XY-plane, a direction in which the manufactured object is formed, a relative moving direction between the stage 12 (supporting part, supporting component, supporting portion) and the nozzle 33, and a scanning direction. Accordingly, for example, the flow Sg in the direction intersecting with the emitting direction of the laser beam 200 can prevent the powder of the materials 121 and the fumes from being widely scattered around the object manufacturing spot 110c.

In the present embodiment, at least one (for example, both) of the opening 334 and the opening 335 is formed in a slit shape. Accordingly, the flow Sg having a larger width can be formed, so that the powder of the materials 121 and the fumes are exhausted more efficiently. The open ends 334a and 335a extend in an elongated shape in a direction skewed with respect to the emitting direction of the laser beam 200. In the present embodiment, as illustrated in FIG. 3, the optical path of the laser beam 200 is positioned between the center part of the open end 34a (the center part in the Y-direction) and the center part of the open end 335a (the center part in the Y-direction). The flow Sg at the open ends 334a and 335a tends to be spread near the ends in the longitudinal direction of the open ends 334a and 335a, and tends to be straight as being away from the ends in the longitudinal direction. Thus, with this configuration (arrangement), for example, exhaust of the powder of the materials 121 and the fumes, and supply of the materials 121 tend to be further stabilized.

In the present embodiment, the body 330 includes a supply part 334, and supplies the powder of the materials 121 together with gas. Accordingly, for example, a configuration may be simplified or downsized. In the present embodiment, the body 330 has both functions of a gas supply part and an exhaust part. That is, the gas supply part and the exhaust part are integrally formed. Thus, for example, the number of components tends to be reduced.

Modification of First Embodiment

Figure 4:
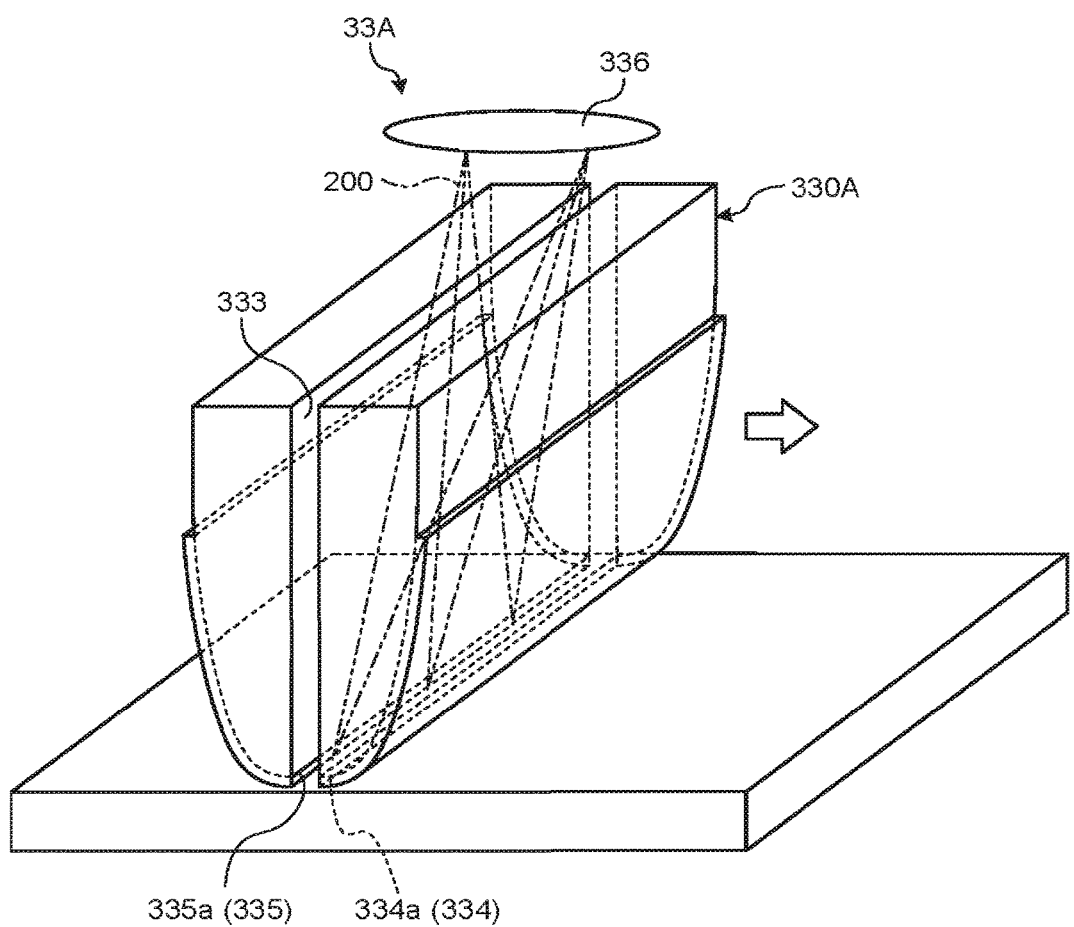
FIG. 4 is a schematic perspective view illustrating a schematic configuration of a nozzle according to a first modification.

A nozzle 33A according to a modification has a configuration similar to that in the first embodiment. Thus, according to the modification of the first embodiment, obtained is a similar result (advantageous effects) based on a configuration and a method (procedure) similar to those in the above embodiment. However, as illustrated in FIG. 4, the nozzle 33A (body 330A) according to the present modification is longer in the Y-direction than the nozzle 33 according to the first embodiment. The laser beam 200 is scanned in the Y-direction by a galvanometer mirror (not illustrated), and emitted via an fθ lens arranged in the nozzle 33 or outside the nozzle 33. That is, in the present modification, the condensing position Pc is scanned (moved) in the Y-direction. Accordingly, the opening 333 for the laser beam 200 is formed in a slit shape elongated in the Y-direction and extending in the Z-direction. In the present modification, the configurations of the opening 334 and the opening 335 are similar to those in the first embodiment except that the opening 334 and the opening 335 are elongated in the Y-direction corresponding to the opening 333 for the laser beam 200. According to the modification, the condensing position Pc, that is, the processing region is widened, so that object manufacturing is performed more efficiently.

Second Embodiment

Figure 6:
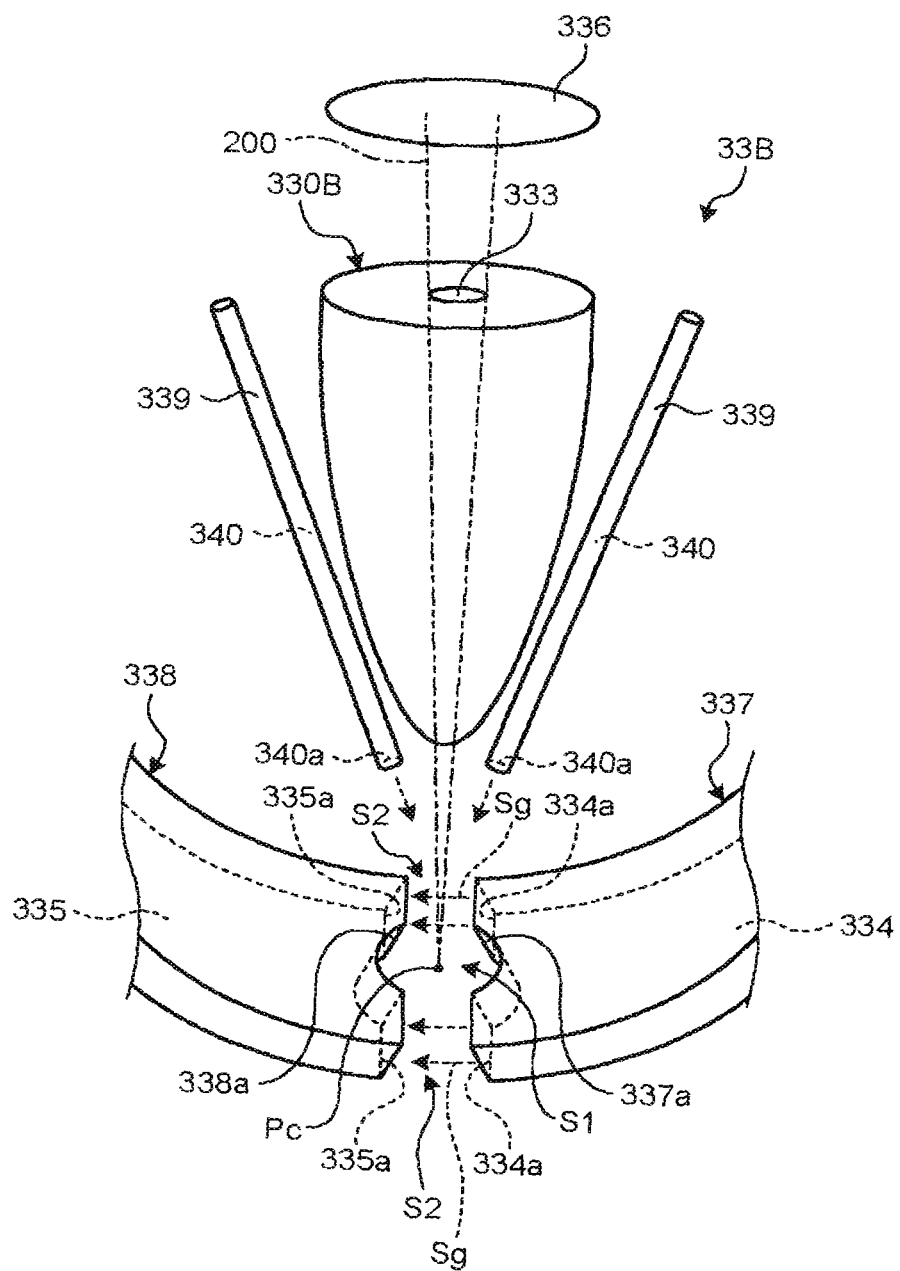
FIG. 6 is a schematic perspective view illustrating a schematic configuration of a nozzle according to the second embodiment.

A layered object manufacturing apparatus 13 according to a second embodiment has a configuration similar to that in the above embodiment and the modification. According to the present embodiment, obtained is a similar result (advantageous effects) based on a configuration similar to that in the above embodiment and the modification. However, as illustrated in FIG. 6. although the opening 333 for the laser beam 200 are provided to the body 330B in the nozzle 333 according to the present embodiment, the openings 334 and 335 used for supplying or exhausting gas are provided to members 337 and 338 other than the body 330B. The powder of the materials 121 is supplied from a member 339 other than the body 330B and the members 337 and 338. In the present embodiment, the nozzle 333 is comprised by integrating the body 330B and the members 337, 338, and 339. In this way, the openings 333, 334, and 335 are not necessarily formed in the same member. The configuration, the shape, the components, and the like of the nozzle 338 may be variously changed. The body 330B is an example of the emitting part, the member 337 is an example of the gas supply part, the member 338 is an example of the exhaust part, and the member 339 is an example of the material supply part.

Figure 5:
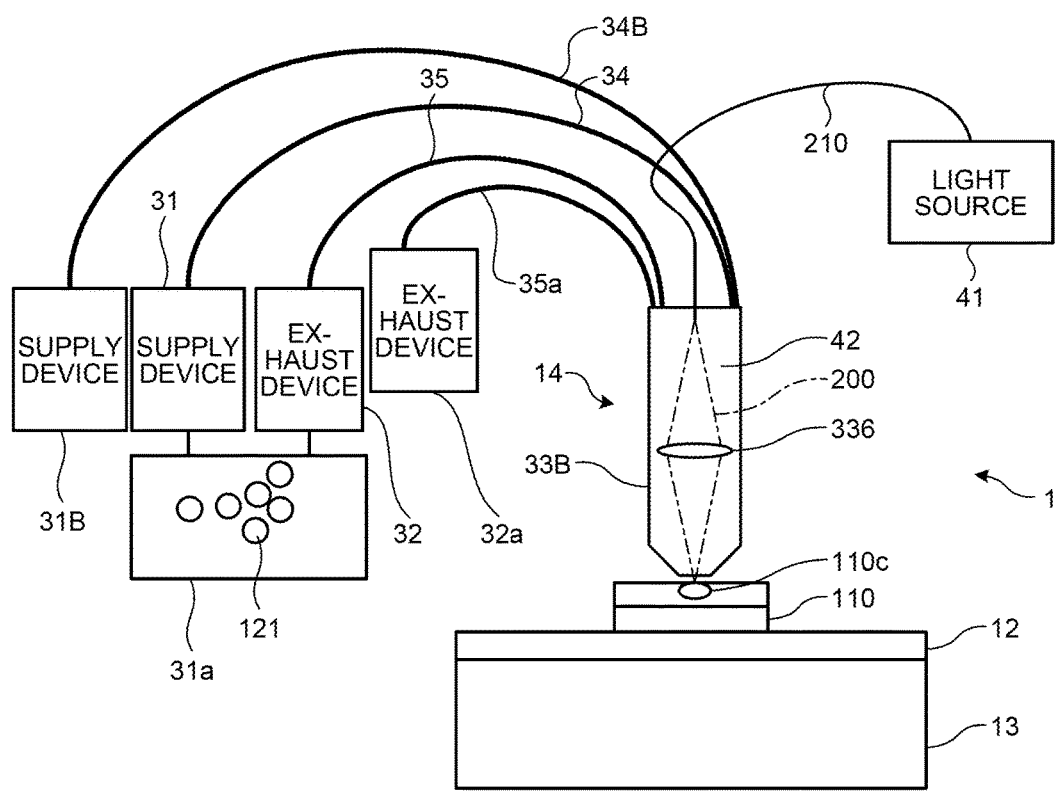
FIG. 5 is a diagram illustrating an example of a schematic configuration of a layered object manufacturing apparatus according to a second embodiment.

As illustrated in FIG. 5, the layered object manufacturing apparatus 13 includes a supply device 313 in addition to the supply device 31 that supplies the materials 121. The supply device 313 does not include the tank 31a (refer to FIG. 1) for the materials 121, and supplies gas without supplying the materials 121. In this case, it can be said that the gas supplied from the supply device 313 is used for scavenging air, not for supplying the powder of the materials 121. The supplied gas is an inert gas similar to that of the supply device 31. The supply device 313 is connected to the member 337 (refer to FIG. 6) via a supply pipe 343 and the like, and the supply device 31 is connected to the member 339 (refer to FIG. 6) via the supply pipe 34 and the like.

As illustrated in FIG. 6, the body 330B of the nozzle 333 has an elongated shape, and the longitudinal direction (axial direction) of the body 330B is along the Z-direction (top-down direction in FIG. 6), for example. The opening 333 is provided to the body 330B as a path through which the laser beam 200 passes. The shape of the opening 333 is similar to that in the first embodiment.

The member 339 is formed in a pipe shape, and the opening 340 is provided as a cylindrical inner space therein. The powder of the materials 121 is supplied with gas from the open end 340a of the opening 340 toward the optical path of the laser beam 200 (condensing position Pc). That is, the opening direction of the opening 340 (the opened direction, the longitudinal direction of the member 339) is oriented toward the condensing position Pc. A plurality of members 339 are arranged around the body 330B. Through the respective members 339, the same powder of the materials 121 may be supplied, or different powder of the materials 121 may be supplied. In this way, when the member 339 that supplies the materials 121 (material supply part) is arranged separately from the member 337 that supplies gas (gas supply part), for example, functions of the respective members may be improved.

Although the different members are arranged, the shape of the openings 334 and 335 is substantially the same as that in the first embodiment except the vicinity of the open end. However, in the present embodiment, the openings 334 and 335 are not opened toward the optical path of the laser beam 200, but opened toward a position off from the optical path, that is, a peripheral part of the optical path of the laser beam 200. That is, the openings 334 and 335 are not opened and blocked at the center part in the width direction of the members 337 and 338 facing a space S1 in which the optical path of a laser beam 200 is formed. The openings 334 and 335 are opened at both ends in the width direction of the members 337 and 338 facing spaces S2 (peripheral parts) adjacent to both sides of the space S1 (both sides in the width direction). In other words, the space S2 as the peripheral part of the optical path of the laser beam 200 is positioned between the open end 334a (opening 334) and the open end 335a (opening 335).

In the nozzle 333 according to the present embodiment, provided are two pairs of the open end 334a (opening 334) and the open end 335a (opening 335), the open end 334a and the open end 335a face each other in each of the two pairs. The two pairs are positioned at both sides across the optical path of the laser beam 200. The open end 334a and the open end 335a face each other in a direction skewed with respect to the emitting direction of the laser beam 200 at a position off from the optical path of the laser beam 200. That is, in one of the pairs, the open end 334a and the open end 335a face each other in the direction skewed with respect to the emitting direction on one side of the optical path of the laser beam 200 (the far side of FIG. 6), and in the other one of the pairs, the open end 334a and the open end 335a face each other in the direction skewed with respect to the emitting direction on the other side of the optical path of the laser beam 200 (the near side of FIG. 6). In each of the pairs, the opening directions of the open ends 334a and 335a are substantially the same. Walls 337a and 338a that at least partly cover the space S1 are arranged on portions of the members 337 and 338 facing the space S1. The walls 337a and 338a are, for example, cylindrically curved to surround the optical path (condensing position Pc) of the laser beam 200. The walls 337a and 338a prevent the openings 334 and 335 from directly facing the optical path of the laser beam 200.

With such a configuration, the gas flow Sg from the opening 334 (gas supply port) toward the opening 335 (exhaust port) is formed in each of the two spaces S2 adjacent to both sides of the space S1. Thus, the flow Sg can prevent the powder of the materials 121 and the fumes from being diffused. At the same time, surplus powder and fumes can be sucked up to be exhausted through the opening 335. The optical path (condensing position Pc) of the laser beam 200 is positioned between the two pairs of the open ends 334a and 335a (openings 334 and 335) facing each other (two spaces S2). Accordingly, for example, the flow Sg between the open. ends 334a and 335a functions as a shield of gas flow against the powder of the materials 121 and fumes. That is, the powder of the materials 121 and the fumes in the space S1 hardly flow out across the flow Sg to the opposite side of the optical path (space S1) of the laser beam 200. The open ends 334a and 335a face the space S2, and do not directly face the optical path (space S1) of the laser beam 200. Accordingly, a flow and turbulence of gas tend to be reduced in the space S1, so that the powder of the materials 121 can be supplied from the opening 340 of the member 339 more stably or more accurately, for example.

According to the present embodiment, a relatively simple configuration can be obtained for preventing the flow from being disturbed in the space S1 where the optical path of the laser beam 200 is positioned with the walls 337a and 338a. In the present embodiment, considering the flow rate and the like of the gas supplied from the opening 340 of the member 339, an opening area of the opening 335 (open end 335a) may be configured to be larger than the opening area of the opening 334 (open end 334a).

Third Embodiment

Figure 7:
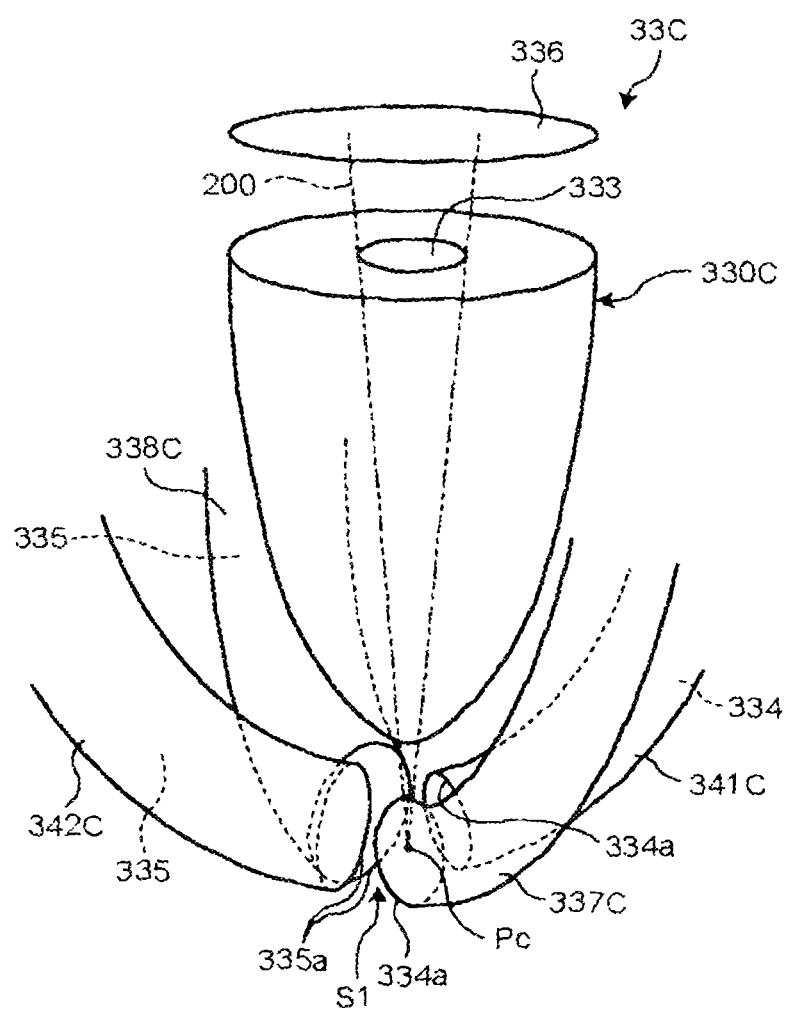
FIG. 7 is a schematic perspective view illustrating a schematic configuration of a nozzle according to a third embodiment.

A nozzle 33C according to a third embodiment has a configuration similar to that in the above embodiments and the modification. According to the present embodiment, obtained is a similar result (advantageous effects) based on a configuration similar to that in the above embodiments and the modification. However, as illustrated in FIG. 7, a body 330C according to the present embodiment includes the opening 333 for the laser beam 200, and the openings 334 and 335 used for supplying or exhausting gas to the space S1 are provided to members 337C, 338C, 341C, and 342C separated from the body 330C. The opening 334 (gas supply port) is provided to the members 337C and 341C (gas supply parts), and the opening 335 (exhaust port) is provided to the members 338C and 342C (exhaust parts). In the present embodiment, the nozzle 33C is comprised by integrating the members 337C, 338C, 341C, and 342C with the body 330C. The body 330C is an example of the emitting part, the members 337C and 341C are an example of the gas supply parts, and the members 338C and 342C are an example of the exhaust parts. Each of the members 337C, 338C, 341C, and 342C extends substantially along the Z-direction (upward direction in FIG. 7) on the upper side, and is gradually curved in a direction perpendicular to the Z-direction toward the laser beam 200 as being closer to a lower side (opposite side of the Z-direction). The shapes of the openings 334 and 335 are similar to those in the above embodiments and the modification except that each of the openings 334 and 335 is not formed in a slit shape and has a substantially circular section.

As illustrated in FIG. 7, the opening 334 of the member 337C and the opening 335 of the member 338C are arranged being opposed to each other on both sides of the space S1 through which the laser beam 200 passes. That is, the member 337C and the member 338C constitute one pair of the openings 334 and 335 arranged facing each other. The opening 334 of the member 341C and the opening 335 of the member 342C are arranged on both sides of the laser beam 200 and face each other. That is, the member 341C and the member 342C constitute another pair of the openings 334 and 335 arranged facing each other. The openings 334 and 335 of the respective members 337C, 338C, 341C, and 342C face the optical path of the laser beam 200 from different directions. With such a configuration, the member 337C and the member 338C can be used in the case supplying a first material 121, and the member 341C and the member 342C can be used in the case supplying a second material 121. In this case, the material used for object manufacturing can be changed more easily. In addition, the first material 121 and the second material 121 can be mixed to be manufactured. For example, by classifying the tank 31a of the exhaust device 32 for each material, different materials 121 may be prevented from being mixed with each other.

The embodiments and the modification have been described above. The embodiments and the modification are exemplary only, and do not intend to limit the scope of the present invention. These embodiments and the modification can be implemented in other various forms, and can be variously omitted, replaced, combined, and modified without departing from the gist of the present invention. The embodiments and the modification thereof are included in the scope and the gist of the present invention, and also included in the invention described in CLAIMS and an equivalent thereof. The present invention can be implemented with a configuration and control (technical characteristics) other than those disclosed in the above embodiments and the modification thereof. According to the present invention, at least one of various results (including advantageous effects and derivative effects) obtained due to the technical characteristics can be obtained.

The invention claimed is:

1. A nozzle of a layered object manufacturing apparatus, the nozzle comprising:
   an emitting part including an opening from which an energy ray is emitted;
   a gas supply part including a gas supply port through which gas is supplied; and
   an exhaust part including an exhaust port through which the gas is exhausted, wherein
   powder of a material is supplied together with gas from the gas supply part,
   the gas supply port and the exhaust port face each other and are spaced apart from each other, and an optical path of the energy ray is positioned between the gas supply port and the exhaust port,
   the emitting part emits the energy ray toward a flow including the material from the gas supply port to the exhaust port, and
   a plurality of pairs of the gas supply port and the exhaust port are provided, the gas supply port and the exhaust port facing each other and being spaced apart from each other.

2. The nozzle according to claim 1, comprising:
   a material supply part including a material supply port through which powder of a material is supplied, in addition to the gas supply part.

3. The nozzle according to claim 1, wherein at least one of the gas supply part and the exhaust part includes a wall that covers the energy ray along an optical path of the energy ray emitted from the emitting part.

4. The nozzle according to claim 1, wherein a direction of an optical path of the energy ray emitted from the emitting part is perpendicular to a direction in which the gas supply port and the exhaust port face each other.

5. The nozzle according to claim 1, wherein powder of different materials is supplied to the each pair of the gas supply port and the exhaust port, the gas supply port and the exhaust port facing each other and being spaced apart from each other.

6. A layered object manufacturing apparatus comprising:
   a light source that emits an energy ray;
   the nozzle according to claim 1;
   a supply part including a path through which a material is supplied to the nozzle; and
   a moving mechanism that moves an object and the nozzle relatively to each other by moving at least one of the nozzle and a stage on which the object is mounted.

7. A nozzle of a layered object manufacturing apparatus, the nozzle comprising:
   an emitting part including an opening from which an enemy ray is emitted
   a gas supply part including a gas supply port through which gas is supplied; and
   an exhaust part including an exhaust port through which the gas is exhausted, wherein
   powder of a material is supplied together with gas from the gas supply part,
   the gas supply port and the exhaust port face each other and are spaced apart from each other, and an optical path of the energy ray is positioned between the gas supply port and the exhaust port,
   the emitting part emits the energy ray toward a flow including the material from the gas supply port to the exhaust port,
   both the gas supply port and the exhaust port are provided in a slit shape, and
   an optical path of the energy ray emitted from the emitting part is positioned between a center part of the gas supply port and a center part of the exhaust port.

8. The nozzle according to claim 7, comprising:
   a material supply part including a material supply port through which powder of a material is supplied, in addition to the gas supply part.

9. The nozzle according to claim 7, wherein
   at least one of the gas supply part and the exhaust part includes a wall that covers the energy ray along an optical path of the energy ray emitted from the emitting part.

10. The nozzle according to claim 7, wherein
    a direction of an optical path of the energy ray emitted from the emitting part is perpendicular to a direction in which the gas supply port and the exhaust port face each other.

11. A layered object manufacturing apparatus comprising:
    a light source that emits an energy ray;
    the nozzle according to claim 7;
    a supply part including a path through which a material is supplied to the nozzle; and
    a moving mechanism that moves an object and the nozzle relatively to each other by moving at least one of the nozzle and a stage on which the object is mounted.

12. A nozzle of a layered object manufacturing apparatus, the nozzle comprising:
    an emitting part including an opening from which an energy ray is emitted;
    a gas supply part including a gas supply port through which gas is supplied; and
    an exhaust part including an exhaust port through which the gas is exhausted, wherein
    powder of a material is supplied together with gas from the gas supply part,
    the gas supply port and the exhaust port face each other and are spaced apart from each other, and an optical path of the energy ray is positioned between the gas supply port and the exhaust port,
    the emitting part emits the energy ray toward a flow including the material from the gas supply port to the exhaust port,
    a plurality of pairs of the gas supply port and the exhaust port are provided, the gas supply port and the exhaust port facing each other and being spaced apart from each other,
    both the gas supply port and the exhaust port are provided in a slit shape, and
    an optical path of the energy ray emitted from the emitting part is positioned between a center part of the gas supply port and a center part of the exhaust port.

13. The nozzle according to claim 12, wherein
    powder of different materials is supplied to the each pair of the gas supply port and the exhaust port, the gas supply port and the exhaust port facing each other and being spaced apart from each other.

* * * * *